(12) United States Patent
Hyun et al.

(10) Patent No.: US 11,793,291 B2
(45) Date of Patent: Oct. 24, 2023

(54) ROTARY TYPE LINEAR RECIPROCATING MOTION DEVICE AND APPLICATOR HAVING THE SAME

(71) Applicants: LG HOUSEHOLD & HEALTH CARE LTD., Seoul (KR); Hae Chang Lee, Incheon (KR)

(72) Inventors: Chang Hwan Hyun, Seoul (KR); Hae Chang Lee, Incheon (KR); Kyung Won Kim, Seoul (KR); Eun Mi Kim, Seoul (KR)

(73) Assignees: LG HOUSEHOLD & HEALTH CARE LTD., Seoul (KR); Hae Chang Lee, Incheon (KR)

( * ) Notice: Subject to any disclaimer, the term of this patent is extended or adjusted under 35 U.S.C. 154(b) by 337 days.

(21) Appl. No.: 17/222,147

(22) Filed: Apr. 5, 2021

(65) Prior Publication Data
US 2022/0039535 A1 Feb. 10, 2022

(30) Foreign Application Priority Data
Aug. 6, 2020 (KR) .................. 10-2020-0098846

(51) Int. Cl.
*A45D 34/04* (2006.01)
*A46B 5/00* (2006.01)
(Continued)

(52) U.S. Cl.
CPC .......... *A45D 34/042* (2013.01); *A46B 5/0008* (2013.01); *A46B 9/021* (2013.01);
(Continued)

(58) Field of Classification Search
CPC ................. F16H 2702/00; F16H 37/16; A46B 2200/1053; A46B 13/02; A46B 13/001; A46B 9/021; A46B 5/0008; A46D 34/042
(Continued)

(56) References Cited

U.S. PATENT DOCUMENTS

| 2004/0168270 A1* | 9/2004 | Choi | .................... A46B 9/04 15/23 |
| 2007/0220689 A1* | 9/2007 | Choi | .................... A61C 17/26 15/22.2 |

FOREIGN PATENT DOCUMENTS

| JP | 62-268508 A | 11/1987 |
| JP | 6-343513 A | 12/1994 |

(Continued)

*Primary Examiner* — Katina N. Henson
(74) *Attorney, Agent, or Firm* — Birch, Stewart, Kolasch & Birch, LLP

(57) ABSTRACT

A rotary type linear reciprocating motion device includes: a driving part rotatably driven by a motor; a rotating part installed at one surface of the driving part, the rotating part transferring a rotational force of the driving part to an applicator; and a reciprocating part installed at the other surface of the driving part, the reciprocating part converting the rotational force of the driving part into a linear reciprocating motion force, the reciprocating part transferring the linear reciprocating motion force to the applicator. The driving part includes: a driving plate having both surfaces at which the rotating part and the reciprocating part are respectively installed; and a driving belt installed at an edge of the driving plate, the driving belt being in contact with a motor shaft of the motor to allow a driving force of the motor to be transferred to the driving plate by a frictional force.

6 Claims, 9 Drawing Sheets

(51) Int. Cl.
*A46B 9/02* (2006.01)
*A46B 13/02* (2006.01)
*F16H 37/16* (2006.01)
*A46B 13/00* (2006.01)

(52) U.S. Cl.
CPC ............ *A46B 13/001* (2013.01); *A46B 13/02* (2013.01); *F16H 37/16* (2013.01); *A46B 2200/1053* (2013.01); *F16H 2702/00* (2013.01)

(58) Field of Classification Search
USPC ....................................................... 15/22.1
See application file for complete search history.

(56) References Cited

FOREIGN PATENT DOCUMENTS

| | | | |
|---|---|---|---|
| JP | 2011-92524 | A | 5/2011 |
| JP | 3220204 | U | 2/2019 |
| KR | 20-2010-0008079 | U | 8/2010 |
| KR | 20-2011-0011009 | U | 11/2011 |
| KR | 10-2013-0003242 | A | 1/2013 |
| KR | 20-0474469 | Y1 | 9/2014 |
| KR | 10-1474324 | B1 | 12/2014 |

* cited by examiner

ROTARY TYPE LINEAR RECIPROCATING MOTION DEVICE AND APPLICATOR HAVING THE SAME

CROSS-REFERENCE TO RELATED APPLICATION

The present application claims priority under 35 U.S.C. § 119(a) to Korean patent application number 10-2020-0098846, filed on Aug. 6, 2020, which is incorporated herein by reference in its entirety.

BACKGROUND

1. Technical Field

The present disclosure generally relates to a rotary type linear reciprocating motion device and an applicator having the same, and more particularly, to a rotary type linear reciprocating motion device and an applicator having the same, in which the applicator simultaneously performs a rotary motion and a linear reciprocating motion, so that a cosmetic product does not agglomerate but can be finely and evenly applied on an object to be applied.

2. Related Art

In general, people apply cosmetic products on their skins by using various applicators so as to express themselves to look healthy and beautiful.

As a kind of applicator, a mascara is used for a user to decorate user's eyelashes such that the eyelashes look long and thick.

The mascara includes a manual mascara. As for the manual mascara, a user makes up user's eyelashes while directly rotating a brush with a user's hand.

As for a conventional manual mascara, a user may have difficulty in rolling up user's eyelashes when the user is not good at making up the eyelashes. Also, the user may have difficulty in creating beautiful eyelashes since the eyelashes are not rolled up round. In addition, since the user is not good at brushing the eyelashes while rotating a brush, a mascara liquid may not be equally applied, and agglomeration of the mascara liquid may occur.

In order to the problem of the manual mascara, an electric mascara has been developed and used.

In a conventional electric mascara, a brush is rotated by an electric motor, and thus anyone can easily and beautifully make up eyelashes.

However, in the conventional electric mascara, the brush is only rotated by the electric motor, a reducer motor, or the like, and therefore, a mascara liquid may lean toward one side of the eyelashes or agglomerate.

In addition, as for the conventional electric mascara, since a user has difficulty in finely applying the mascara liquid to a left/right side of the eyelashes, there is an inconvenience in that the user should apply the mascara liquid to the eyelashes while laterally moving the brush.

Also, in the conventional electric mascara, the brush is rotated regardless of external pressure. Hence, when external pressure is generated such as when the brush is adhered closely to skin, an overload is applied to the electric motor, and therefore, an electric module or an applicator may be damaged.

SUMMARY

Embodiments provide a rotary type linear reciprocating motion device and an applicator having the same, in which the applicator simultaneously performs a rotary motion and a linear reciprocating motion, so that a cosmetic product does not agglomerate but can be finely and evenly applied on an object to be applied.

Embodiments also provide a rotary type linear reciprocating motion device and an applicator having the same, in which, when a certain external pressure or higher is applied to the applicator in which a rotary function and a reciprocating function are simultaneously implemented, a motor is idly rotated, so that the motor or the applicator can be prevented from being damaged due to an overload.

Embodiments also provide a rotary type linear reciprocating motion device and an applicator having the same, in which the applicator has a two-stage brush structure, and two brush-bars perform a linear reciprocating motion in the same direction or different directions while performing an internal rotary motion, so that a cosmetic product does not agglomerate but can be more finely and evenly applied on an object to be applied.

In accordance with an aspect of the present disclosure, there is provided a rotary type linear reciprocating motion device including: a driving part rotatably driven by a motor; a rotating part installed at one surface of the driving part, the rotating part transferring a rotational force of the driving part to an applicator; and a reciprocating part installed at the other surface of the driving part, the reciprocating part converting the rotational force of the driving part into a linear reciprocating motion force, the reciprocating part transferring the linear reciprocating motion force to the applicator, wherein the driving part includes: a driving plate having both surfaces at which the rotating part and the reciprocating part are respectively installed; and a driving belt installed at an edge of the driving plate, the driving belt being in contact with a motor shaft of the motor to allow a driving force of the motor to be transferred to the driving plate by a frictional force.

The driving belt may be made of an elastic material of rubber, and be detachable from the driving plate.

The motor shaft may be idly rotated, when a certain external pressure or higher is applied to the applicator in which a rotary function and a reciprocating function are simultaneously implemented.

The applicator may have a one-stage brush structure in which a rotary motion and a linear reciprocating motion are simultaneously implemented by the rotating part and the reciprocating part. The applicator may include: a brush-bar connected to the rotating part; and a brush coupled to an end portion of the brush-bar.

The rotating part may include: a worm shaft installed at one surface of the driving plate to be rotated together with the driving plate; a worm gear geared with a worm of the worm shaft to be rotated; a first spur gear connected to the worm gear in one rotating shaft direction of the worm gear; a second spur gear geared with the first spur gear, the second spur gear being provided on the same line as the brush-bar; and an operating shaft provided at one side of the second spur gear to be coupled to brush-bar, the operating shaft transferring a rotary motion force and a linear reciprocating motion force.

The reciprocating part may include: an eccentric cam installed at the other surface of the driving plate to be rotated together with the driving plate; an elliptical ring performing a linear reciprocating motion through the rotation of the eccentric cam; a connecting-bar connected to the elliptical ring, the connecting-bar extending toward the brush-bar; and a coupling member connected to the connecting-bar, the coupling member being coupled to the operating shaft while being penetrated by the operating shaft such that the operating shaft is rotatable, the coupling member transferring a linear reciprocating motion force to the operating shaft.

The second spur gear may be movable since the second spur gear is not restricted in an X-axis direction, and be slidable through both a rotary motion performed by the first spur gear and a linear reciprocating motion of the coupling member within a range of engagement with the first spur gear.

The applicator may have a two-stage brush structure in which a rotary motion and a linear reciprocating motion are simultaneously implemented by the rotating part and the reciprocating part. The applicator may include: first and second brush-bars connected to the rotating part, the first and second brush-bars being disposed in parallel to each other while being adjacent to each other; and first and second brushes respectively coupled to end portions of the first and second brush-bars.

The rotating part may include: a worm shaft installed at one surface of the driving plate to be rotated together with the driving plate; first and second worm gears respectively geared with both sides of a worm of the worm shaft to be rotated; first and second internal spur gears respectively connected in one rotating shaft directions of the first and second worm gears; first and second external spur gears respectively geared with the first and second internal spur gears, the first and second external spur gears being respectively provided on the same lines as the first and second brush-bars; and first and second operating shafts respectively provided at one sides of the first and second external spur gears to be coupled to the first and second brush-bars, the first and second operating shafts transferring a rotary motion force and a linear reciprocating motion force.

The reciprocating part may include: an eccentric cam installed at the other surface of the driving plate to be rotated together with the driving plate; an elliptical ring performing a linear reciprocating motion through the rotation of the eccentric cam; a connecting-bar connected to the elliptical ring, the connecting-bar extending toward the first brush-bar; a first coupling member connected to the connecting-bar, the first coupling member being coupled to the first operating shaft while being penetrated by the first operating shaft such that the first operating shaft is rotatable, the first coupling member transferring a linear reciprocating motion force to the first operating shaft; a second coupling member coupled to the second operating shaft while being penetrated by the second operating shaft such that the second operating shaft is rotatable, the second coupling member transferring a linear reciprocating motion force to the second operating shaft; and a link hinge-coupled to each of the first and second coupling members, the link transferring the linear reciprocating motion force of the first coupling member to the second coupling member.

Each of the first and second external spur gears may be movable since each of the first and second external spur gears is not restricted in an X-axis direction, and be slidable through both a rotary motion performed by the first and second internal spur gears and a linear reciprocating motion of the first and second coupling members within a range of engagement with the first and second internal spur gears.

Each of the first and second brush-bars may be rotated in an internal direction. The first and second brush-bars may perform a linear reciprocating motion in different directions through the link.

The reciprocating part may include: an eccentric cam installed at the other surface of the driving plate to be rotated together with the driving plate; an elliptical ring performing a linear reciprocating motion through the rotation of the eccentric cam; first and second connecting-bars respectively connected to both sides of the elliptical ring, the first and second connecting-bars respectively extend toward the first and second brush-bars; and a common coupling member connecting between the first and second connecting-bars, the common coupling member being coupled to each of the first and second operating shafts while being penetrated by each of the first and second operating shafts such that each of the first and second operating shafts is rotatable, the common coupling member transferring a linear reciprocating motion force to the first and second operating shafts.

Each of the first and second external spur gears may be movable since each of the first and second external spur gears is not restricted in an X-axis direction, and be slidable through both a rotary motion performed by the first and second internal spur gears and a linear reciprocating motion of the common coupling member within a range of engagement with the first and second internal spur gears.

Each of the first and second brush-bars may be rotated in an internal direction. The first and second brush-bars may perform a linear reciprocating motion in the same direction through the common coupling member.

The reciprocating part may include: a two-stage eccentric cam installed at the other surface of the driving plate to be rotated together with the driving plate, the two-stage eccentric cam being configured with a lower eccentric cam and an upper eccentric cam; a first elliptical ring performing a linear reciprocating motion through rotation of the lower eccentric cam; a second elliptical ring performing a linear reciprocating motion through rotation of the upper eccentric cam above the first elliptical ring; a first connecting-bar connected to the first elliptical ring, the first connecting-bar extending toward the first brush-bar; a second connecting-bar connected to the second elliptical ring, the second connecting-bar extending toward the second brush-bar; a first coupling member connected to the first connecting-bar, the first coupling member being coupled to the first operating shaft while being penetrated by the first operating shaft such that the first operating shaft is rotatable, the first coupling member transferring a linear reciprocating motion force to the first operating shaft; and a second coupling member connected to the second connecting-bar, the second coupling member being coupled to the second operating shaft while being penetrated by the second operating shaft such that the second operating shaft is rotatable, the second coupling member transferring a linear reciprocating motion force to the second operating shaft.

Each of the first and second external spur gears may be movable since each of the first and second external spur gears is not restricted in an X-axis direction, and be slidable through both a rotary motion performed by the first and second internal spur gears and a linear reciprocating motion of the first and second coupling members within a range of engagement with the first and second internal spur gears.

The two-stage eccentric cam may be provided such that the lower eccentric cam and the upper eccentric cam have a phase difference of 180 degrees. Each of the first and second brush-bars may be rotated in an internal direction. The first and second brush-bars may perform a linear reciprocating motion in different directions through the two-stage eccentric cam having the phase difference of 180 degrees.

The two-stage eccentric cam may be provided such that the lower eccentric cam and the upper eccentric cam have a phase difference of 0. Each of the first and second brush-bars may be rotated in an internal direction. The first and second brush-bars may perform a linear reciprocating motion in the same direction through the two-stage eccentric cam having the phase difference of 0.

In accordance with another aspect of the present disclosure, there is provided an applicator including the rotary type linear reciprocating motion device.

In the rotary type linear reciprocating motion device and the applicator having the same in accordance with the present disclosure, when a certain external pressure or higher is applied to the applicator while the applicator is performing a rotary motion and a linear reciprocating motion, the motor is idly rotated, so that the motor or the applicator can be prevented from being damaged due to an overload.

Also, in the rotary type linear reciprocating motion device and the applicator having the same in accordance with the present disclosure, when the applicator has a one-stage brush structure, one brush-bar simultaneously performs a rotary motion and a linear reciprocating motion, so that a cosmetic product does not agglomerate but can be finely and evenly applied on an object to be applied.

Also, in the rotary type linear reciprocating motion device and the applicator having the same in accordance with the present disclosure, when the applicator has a two-stage brush structure, two brush-bars perform a linear reciprocating motion in the same direction or different directions while performing an internal rotary motion, so that two brushes can implement various functions of scrubbing, pushing, pulling, and rubbing in a state in which the two brushes slightly press an object. Thus, a cosmetic product does not agglomerate but can be more finely and evenly applied on an object to be applied.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 7A:
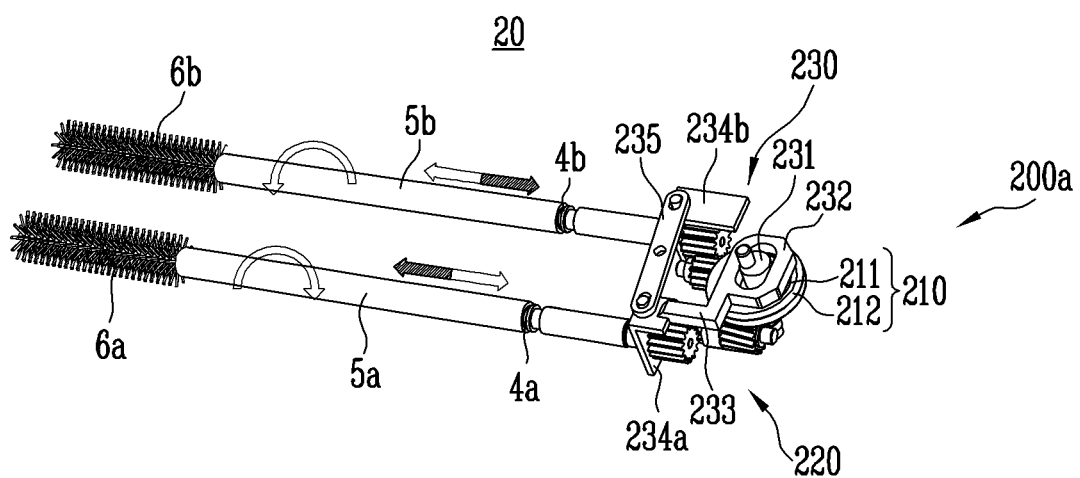
Figure 7B:
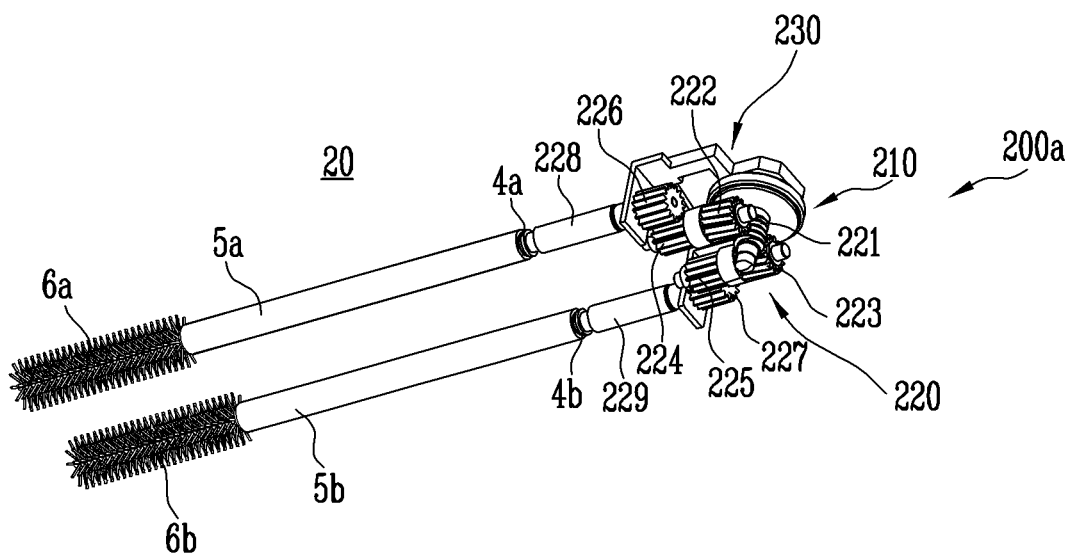

(a) and (b) of FIG. 7 are partial perspective views illustrating a rotary type linear reciprocating motion device to which an applicator is applied in accordance with a second embodiment of the present disclosure.

Figure 8A:
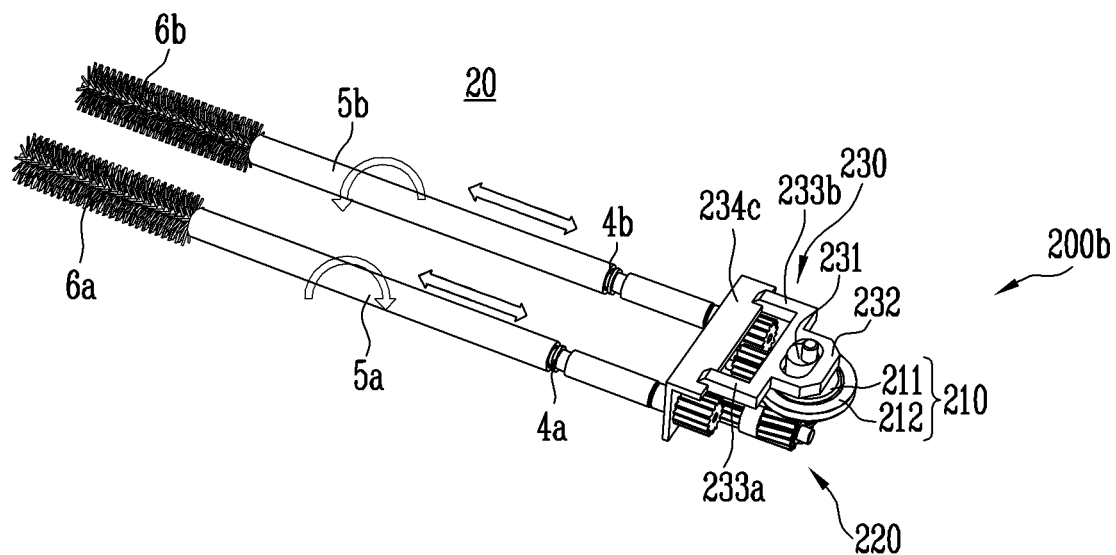
Figure 8B:
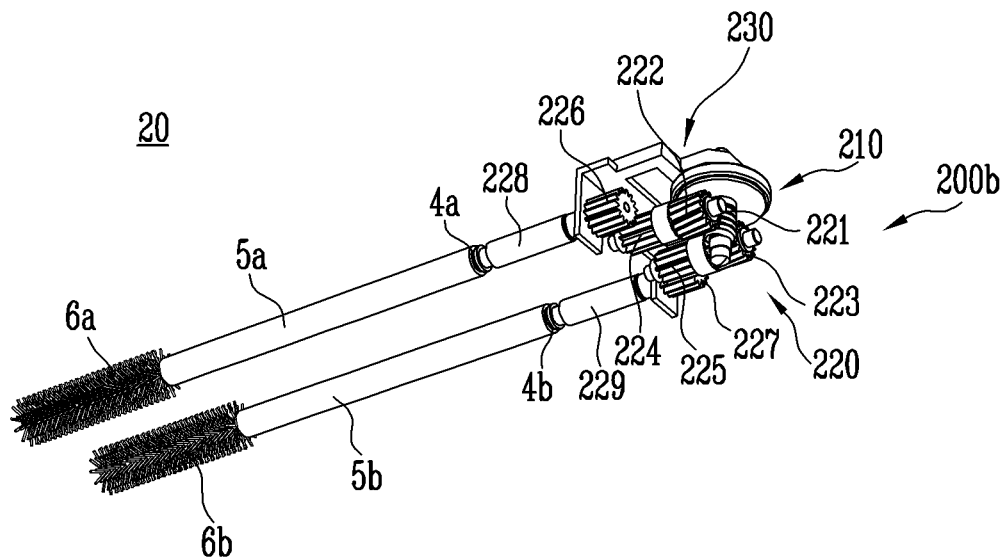

(a) and (b) of FIG. 8 are views illustrating another embodiment of a driving module shown in FIG. 7.

Figure 9A:
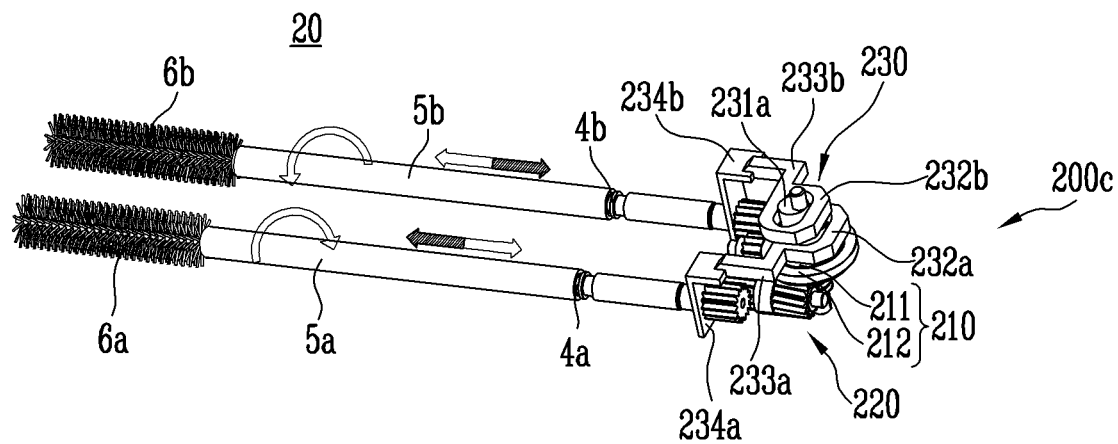
Figure 9B:
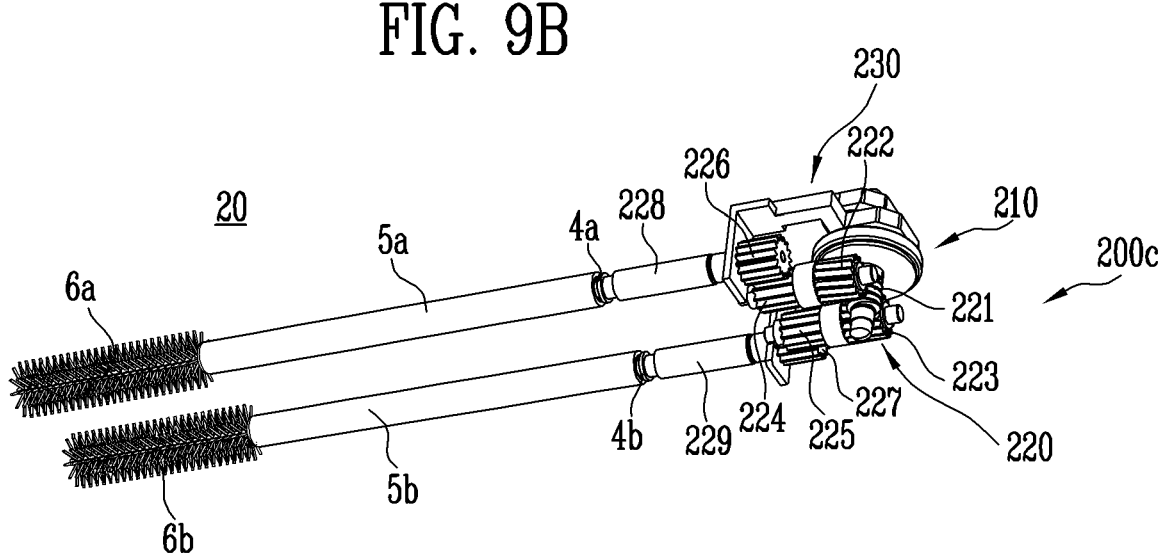

(a) and (b) of FIG. 9 are views illustrating still another embodiment of the driving module shown in FIG. 7.

DETAILED DESCRIPTION

Other objects, specific advantages, and new features of the present disclosure will be more apparent from preferable embodiments and the following detailed description associated with the accompanying drawings. In the specification, when reference numerals are endowed to components in each drawing, it should be noted that like reference numerals denote like elements even though they are depicted in several drawings. Further, in the following description of the present disclosure, a detailed explanation of known related technologies may be omitted to avoid unnecessarily obscuring the subject matter of the present disclosure.

Hereinafter, exemplary embodiments of the present disclosure will be described in detail with reference to the accompanying drawings.

Figure 1:
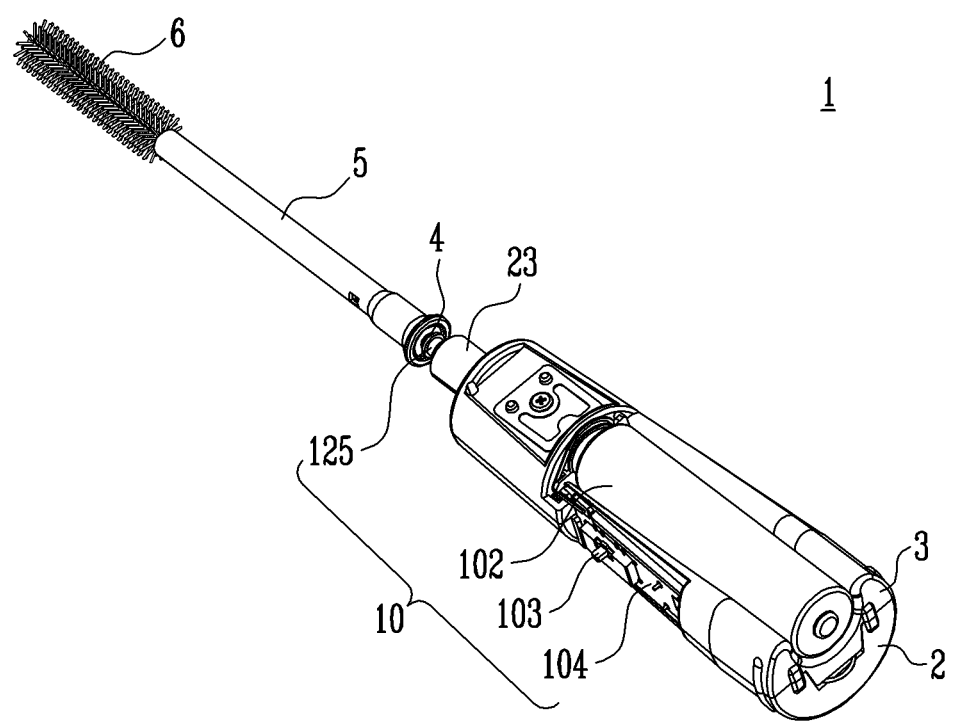
FIG. 1 is a perspective view of an applicator to which a rotary type linear reciprocating motion device is applied in accordance with a first embodiment of the present disclosure.
Figure 2:
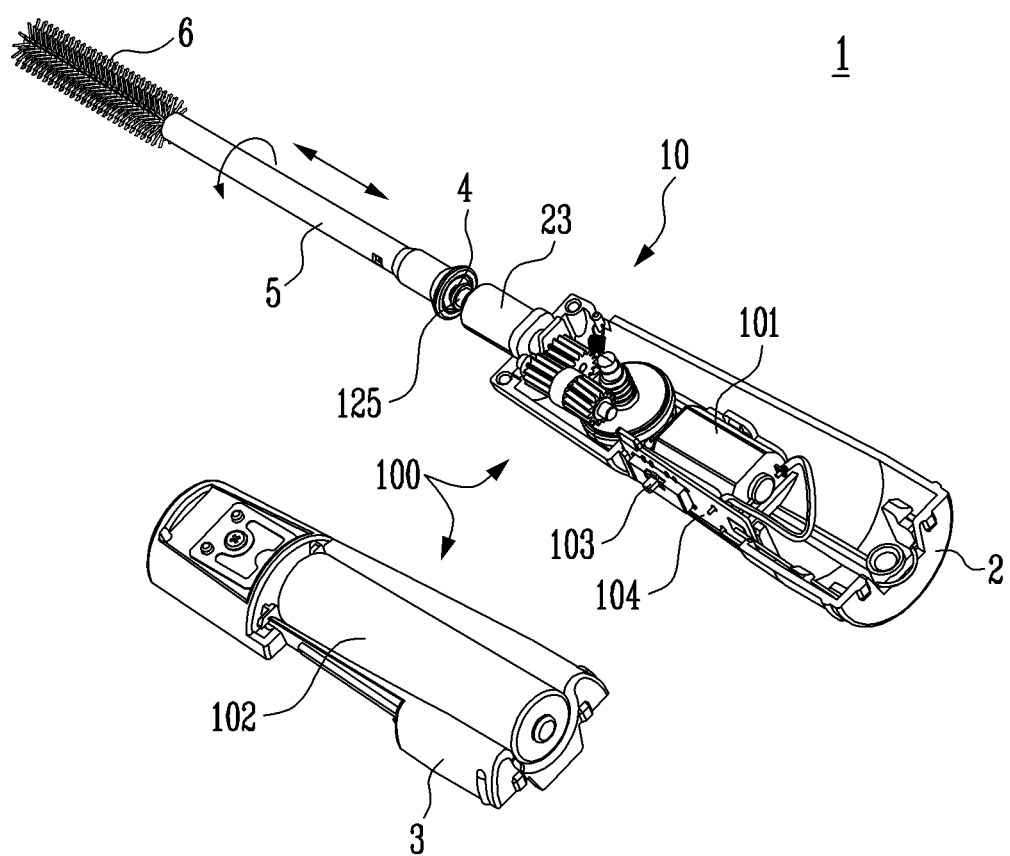
FIG. 2 is a partial exploded perspective view of the applicator to which the rotary type linear reciprocating motion device is applied in accordance with the first embodiment of the present disclosure.
Figure 3:
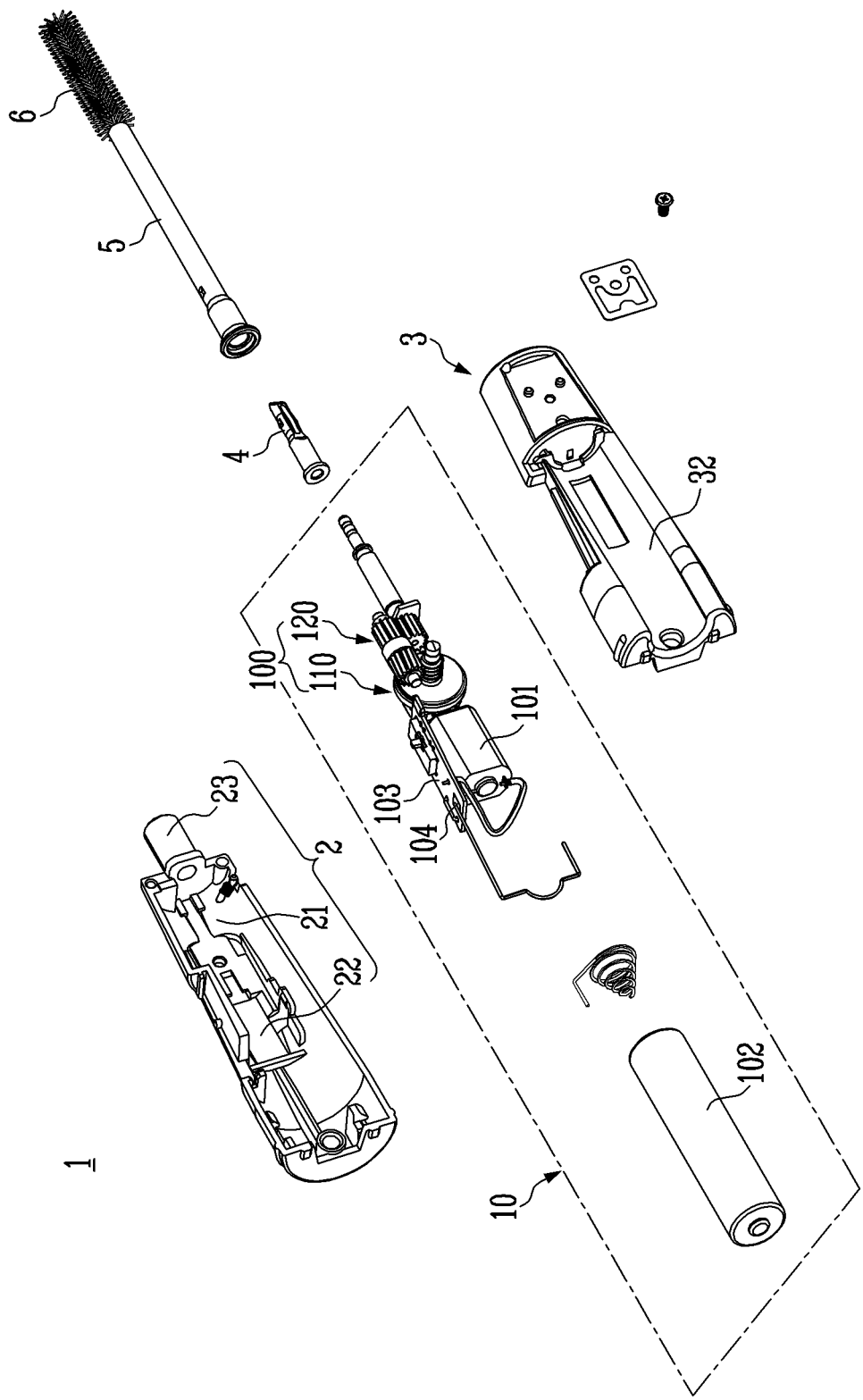
FIG. 3 is a front exploded perspective view of the applicator to which the rotary type linear reciprocating motion device is applied in accordance with the first embodiment of the present disclosure.
Figure 4:
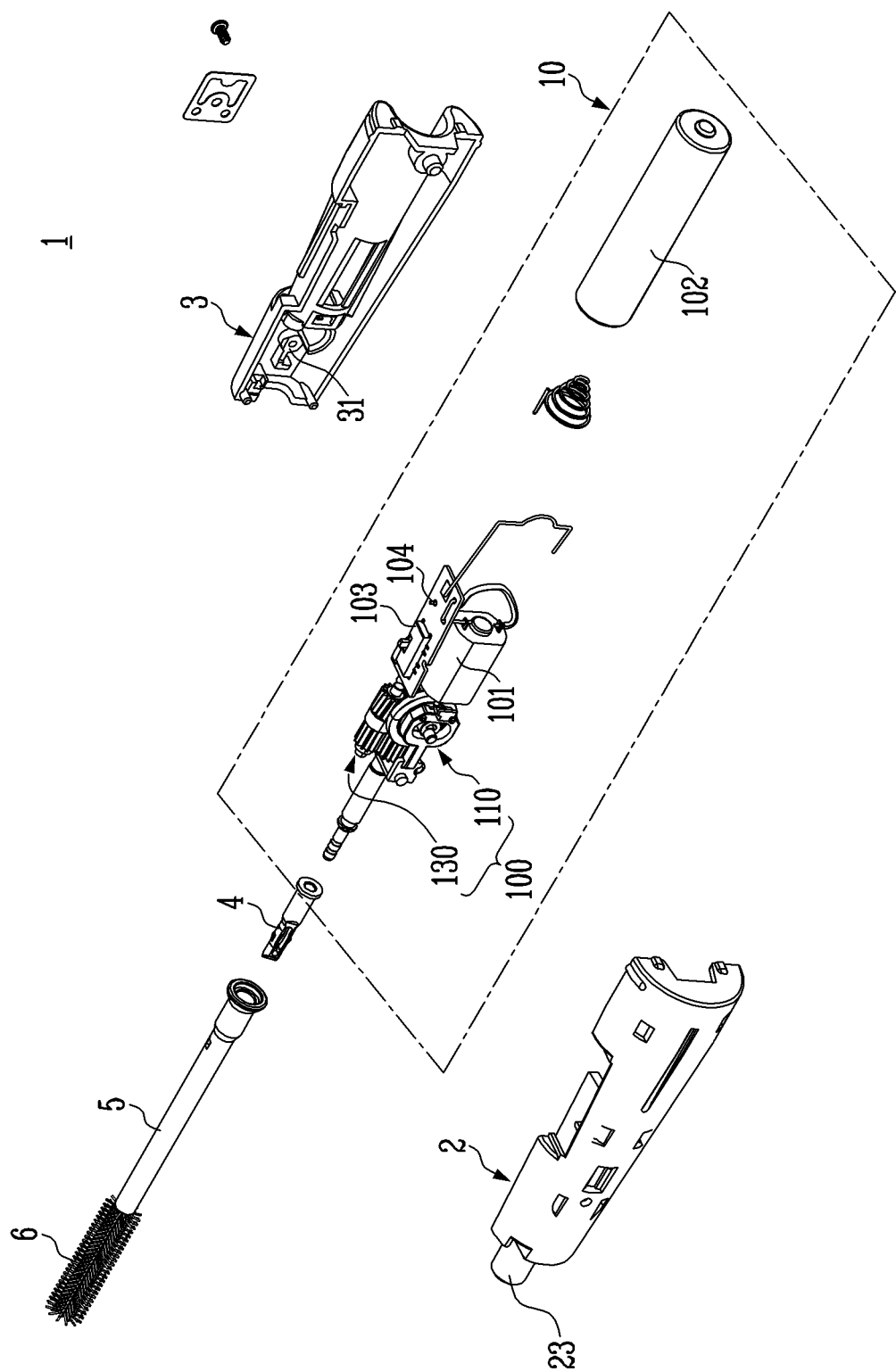
FIG. 4 is a rear exploded perspective view of the applicator to which the rotary type linear reciprocating motion device is applied in accordance with the first embodiment of the present disclosure.
Figure 5:
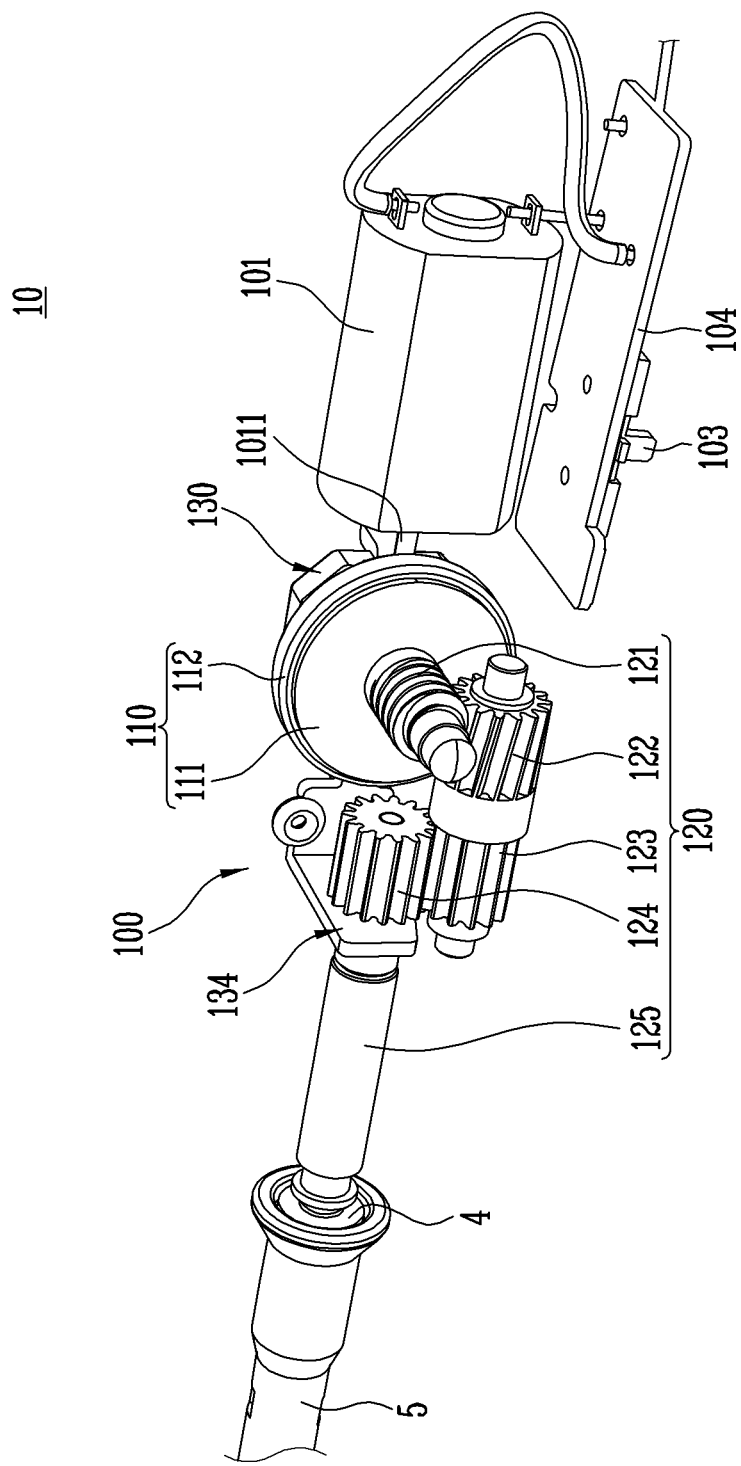
FIGS. 5 and 6 are views illustrating a driving module of the rotary type linear reciprocating motion device in accordance with the first embodiment of the present disclosure.
Figure 6:
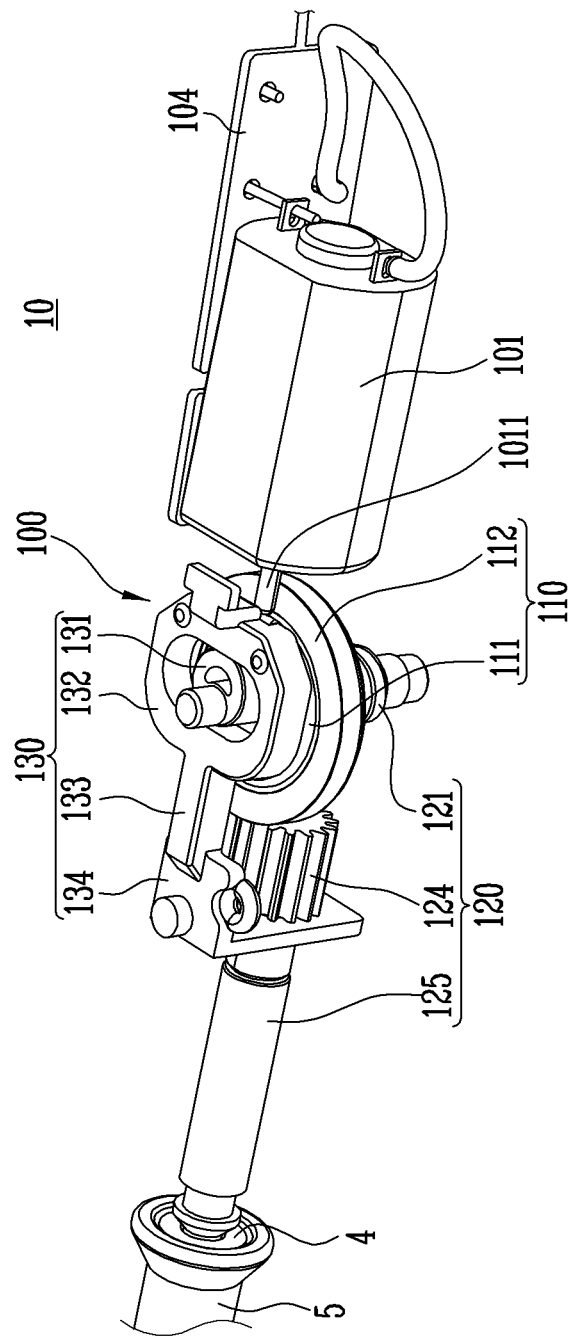

FIG. 1 is a perspective view of an applicator to which a rotary type linear reciprocating motion device is applied in accordance with a first embodiment of the present disclosure. FIG. 2 is a partial exploded perspective view of the applicator to which the rotary type linear reciprocating motion device is applied in accordance with the first embodiment of the present disclosure. FIG. 3 is a front exploded perspective view of the applicator to which the rotary type linear reciprocating motion device is applied in accordance with the first embodiment of the present disclosure. FIG. 4 is a rear exploded perspective view of the applicator to which the rotary type linear reciprocating motion device is applied in accordance with the first embodiment of the present disclosure. FIGS. 5 and 6 are views illustrating a driving module of the rotary type linear reciprocating motion device in accordance with the first embodiment of the present disclosure.

In addition, (a) and (b) of FIG. 7 are partial perspective views illustrating a rotary type linear reciprocating motion device to which an applicator is applied in accordance with a second embodiment of the present disclosure. (a) and (b) of FIG. 8 are views illustrating another embodiment of a driving module shown in FIG. 7. (a) and (b) of FIG. 9 are views illustrating still another embodiment of the driving module shown in FIG. 7. (a) of each of FIGS. 7 and 9 is a view illustrating a driving part and a reciprocating part of the driving module, and (b) of each of FIGS. 7 and 9 is a view illustrating a rotating part of the driving module.

Hereinafter, in the case of various driving modules 100 and 200 to be described for each of the first and second embodiments with reference to the accompanying drawings, the driving module 100 in accordance with the first embodiment shown in FIGS. 1 to 6 is configured such that a brush-bar 5 in a one-stage brush structure implements a rotary motion and a linear reciprocating motion, the driving module 200 in accordance with the second embodiment shown in FIGS. 7 and 8 is configured such that first and second brush-bars 5a and 5b in a two-stage brush structure perform a linear reciprocating motion in different directions while performing an internal rotary motion, and the driving module in accordance with the second embodiment shown in FIG. 9 is configured such that the first and second brush-bars 5a and 5b in the two-stage brush structure perform the linear reciprocating motion in the same direction while performing the internal rotary motion.

Also, hereinafter, a case where an applicator 1 to which rotary type linear reciprocating motion devices 10 and 20 in accordance to the first and second embodiments are applied is a mascara will be described as an example. The present disclosure is not limited to a case where the applicator 1 is an electric mascara, and it will be apparent that another applicator to which the rotary type linear reciprocating motion devices 10 and 20 can be applied may be included. In these embodiments, the applicator may be used as a meaning including an electric toothbrush and the like, to which the rotary type linear reciprocating motion devices 10 and 20 are applied.

Referring to FIGS. 1 to 6, the rotary type linear reciprocating motion device 10 in accordance with the first embodiment of the present disclosure may be applied to the applicator 1. In this embodiment, when the applicator 1 is a mascara, the applicator 1 may have a one-stage brush structure in which one mascara brush is provided.

The applicator 1 may include first and second cases 2 and 3 for accommodating the rotary type linear reciprocating motion device 10, and a holder 4, the brush-bar 5, and a brush 6, which are coupled to the rotary type linear reciprocating motion device 10.

The first case 2 may be provided with a space capable of accommodating the driving module 100 and a motor 101, and include a driving module accommodating part 21 and a motor accommodating part 22.

The driving module accommodating part 21 may be provided at a front portion of the first case 2, and accommodate and fix the driving module 100.

The motor accommodating part 22 may be provided at a middle portion of the first case 2, and accommodate and fix the motor 101.

A connection tube 23 extending frontward with a certain length may be provided at a front end portion of the first case 2. An operating shaft 125 of the driving module 100 may be inserted into the connection tube 23, and the connection tube 23 may function to guide the operating shaft 125 to perform a rotary motion and a linear reciprocating motion without shaking.

The second case 3 may be provided with a space capable of accommodating the driving module 100 and a battery 102, and include a driving module cover part 31 and a battery accommodating part 32.

The driving module cover part 31 may be provided with a space at a portion facing the driving module accommodating part 21 of the first case 2, and cover the driving module 100 accommodated in the driving module accommodating part 21 such that the driving module 100 can be sealed and fixed.

The battery accommodating part 32 may be provided at a rear portion of the driving module cover part 31, and accommodate and fix the battery 102.

The battery accommodating part may be of an external exposure type in which a bottom surface is formed between the battery 102 and the motor 101 such that influence of heat generated from the motor 101 can be minimized while facilitating replacement of the battery 102.

The first and second cases 2 and 3 may be coupled to each other, a circuit board 104 may be installed in the first and second cases 2 and 3, and a switch 103 exposed to the outside may be mounted on the circuit board 104.

A case body may be provided separately from the first and second cases 2 and 3 coupled to each other. The case body may accommodate the first and second cases 2 and 3, and only the switch 103 may be exposed to the outside of the case body.

The holder 4 may connect the operating shaft 125 of the driving module 100 to the brush-bar 5 of the applicator 1. When one end portion of the brush-bar 5 is directly connected to the operating part 125, the holder 4 may be omitted.

The brush-bar 5 may receive a rotary motion force and a linear reciprocating motion force, which are transferred from the operating shaft 125 of the driving module 100 by the holder 4, to enable the brush 6 to perform a rotary motion and a linear reciprocating motion.

The brush 6 may be coupled to an end portion of the brush-bar 5, and be detachable. The brush 6 is a part in direct contact with an object, and may apply a cosmetic liquid to the object while simultaneously performing a rotary motion and a linear reciprocating motion. The object may be eyelashes when the applicator 1 is an electric mascara, and be teeth when the applicator 1 is an electric toothbrush instead of the electric mascara. However, the present disclosure is not limited thereto.

Hereinafter, the rotary type linear reciprocating motion device 10 applied to the applicator 1 will be described in detail.

As shown in FIGS. 1 to 6, the rotary type linear reciprocating motion device 10 in accordance with this embodiment may be mounted in various applicators 1, and be configured to allow the applicator 1 having the rotary type linear reciprocating motion device 10 mounted therein to simultaneously perform a rotary motion and a linear reciprocating motion.

Together with the driving module 100 configured to enable the applicator 1 to simultaneously perform a rotary motion and a linear reciprocating motion, the rotary type linear reciprocating motion device 10 may include the motor 101 provided with a motor shaft 1011 for providing a driving force to the driving module 100, the battery 102 for supplying power to the motor 101, and the switch 103 and the circuit board 104, which control the driving module 100.

The switch 103 and the circuit board 104 are components for controlling the driving module 100, and may be configured to turn on/off the driving module 100 and implement various functions such as a speed adjustment function in a rotary motion and linear reciprocating motion mode. This functional configuration may be implemented from that known in the art, and therefore, a detailed description of the functions will be omitted in this embodiment.

The driving module 100 may be installed in the first and second cases 2 and 3 to allow the applicator 1 to simultaneously perform a rotary motion and a linear reciprocating motion. The driving module 100 may include a driving part 110, a rotating part 120, and a reciprocating part 130.

The driving part 110 may be rotatably driven by a driving force of the motor 101, and transfer a rotational force to the rotating part 120 and the reciprocating part 130. The driving part 110 may include a driving plate 111 and a driving belt 112.

The rotating part 120 and the reciprocating part 130 may be respectively installed at both surfaces of the driving plate 111, and the driving plate 111 may be configured in a disk shape.

The driving belt 112 may be installed at an edge of the driving plate 111, and be in contact with a motor shaft 1011 to allow the driving force of the motor 101 to be transferred the driving plate 111 by a frictional force.

The driving belt 112 may be made of an elastic material of rubber, and be detachable from the driving plate 111.

The driving part 110 is not configured such that the motor shaft 1011 is coupled to the driving belt 112, but configured such that the motor shaft 101 is in contact with a surface of the driving belt 112 to allow the driving plate 111 to be rotated by the frictional force. Thus, when a certain external pressure or higher is applied to the brush-bar 5 or the brush 6 of the applicator 1 in which a rotary function and a reciprocating function are simultaneously implemented, rotation of the driving plate 111 is stopped by the external pressure. The motor shaft 1011 is idly rotated on the driving belt 112. Accordingly, although an overload is applied to the motor 101 when a certain external pressure or higher is applied to the brush-bar 5 or the brush 6, the overload can be removed while the motor shaft 1011 is idly rotated.

The rotating part 120 may be installed at one surface of the driving part 110, and transfer the rotational force of the driving part 110 to the applicator 1 to enable the applicator 1 to perform a rotary motion. The rotating part 120 may include a word shaft 121, a worm gear 122, a first spur gear 123, a second spur gear 124, and the operating shaft 125.

The worm shaft 121 may be installed at one surface of the driving plate 111, to be rotated together with the driving plate 111. The worm shaft 121 may be disposed at the center of the driving plate 111. The worm shaft 121 may be a shaft made by directly cutting an outer surface thereof into a worm, or be a shaft inserted into a worm manufactured separately.

The worm gear 122 may be rotated by being geared with the worm of the worm shaft 121.

The first spur gear 123 may be connected to the worm gear 122 in one rotating shaft direction of the worm gear 122. The first spur gear 123 may transfer a rotational force of the worm gear 122 to the second spur gear 124.

The second spur gear 124 may be geared with the first spur gear 123, and be provided on the same line as the brush-bar 5. The second spur gear 124 may transfer a rotational force of the first spur gear 124 to the operating shaft 125.

Since the second spur gear 124 is not restricted in an X-axis direction, the second spur gear 124 may be moved, and be slidable through both a rotary motion performed by the first spur gear 123 and a linear reciprocating motion of a coupling member 134 which will be described later within a range of gear engagement with the first spur gear 123. Accordingly, the second spur gear 124 can transfer a rotary motion force to the brush-bar 5 even when the second spur gear 124 is moved in a shaft direction by the reciprocating part 130.

The operating shaft 125 may be provided at one side of the second spur gear 124 to be coupled to the brush-bar 5. The operating shaft 125 may transfer, to the brush-bar 5, not only a rotary motion force generated by the second spur gear 124 but also a linear reciprocating motion force generated by the reciprocating part 130 which will be described later.

In the above, the rotational force of the driving plate 111, which is transferred to the word shaft 121, changes the axis of a rotary motion in a normal direction through the worm gear 122, so that the rotary motion force can be transferred to the brush-bar 5 through the first and second spur gears 123 and 124.

The reciprocating part 130 may be installed at the other surface of the driving part 110. The reciprocating part 130 may convert the rotational force of the driving part 110 into a linear reciprocating motion force and transfer the linear reciprocating motion force to the applicator 1 such that the applicator 1 can perform a linear reciprocating motion. The reciprocating part 130 may include an eccentric cam 131, an elliptical ring 132, a connecting-bar 133, and the coupling member 134.

The eccentric cam 131 may be installed at the other surface of the driving plate 111, to be rotated together with the driving plate 111. Since the eccentric cam 131 has a central axis disposed at the center of the driving plate 111 and is eccentric, the eccentric cam 131 may allow the elliptical ring 132 to convert a rotational force transferred from the eccentric cam 131 into a linear reciprocating motion force.

The elliptical ring 132 may convert the rotational force transferred from the eccentric cam 131 into a linear reciprocating motion force.

When the eccentric cam 131 performs a rotary motion, the elliptical ring 132 has an elliptical groove having a width corresponding to the radius of a track and a width corresponding to the diameter of the track.

Since the eccentric cam 131 performs a rotary motion along an inner circumferential surface of the elliptical groove, the elliptical ring 132 performs a linear reciprocating motion.

The connecting-bar 133 may be connected to the elliptical ring 132, and extend toward the brush-bar 5. The connecting-bar 133 may transfer the linear reciprocating motion force of the elliptical ring 132 to the coupling member 134.

The coupling member 134 may be connected to the connecting-bar 133. The coupling member 134 may be coupled to the operating shaft 125 while being penetrated by the operating shaft 125 such that the operating shaft 125 can be rotated. The coupling member 134 may transfer the linear reciprocating motion force to the operating shaft 125.

(a) and (b) of FIG. 7 are partial perspective views illustrating a rotary type linear reciprocating motion device to which an applicator is applied in accordance with a second embodiment of the present disclosure.

Referring to (a) and (b) of FIG. 7, the rotary type linear reciprocating motion device 20 in accordance with the second embodiment of the present disclosure may be applied to the applicator 1. In this embodiment, when the applicator 1 is a mascara, the applicator may have a two-stage brush structure in which two mascara brushes are provided.

The applicator 1 may be configured identically or similarly to the first embodiment described above.

That is, although the first and second cases 2 and 3 as the components of the applicator 1 described with reference to FIGS. 1 to 6 in the first embodiment are not illustrated, the applicator 1 of this embodiment may include a case which has the same structure as the first and second cases 2 and 3 and has a size different from that of the first and second cases 2 and 3 (in this embodiment, the case may have a large size as compared with the first embodiment since the case has a two-stage brush structure, unlike the one-stage brush structure), or include a case having another structure, which can accommodate the rotary type linear reciprocating motion device 20 of this embodiment. Also, unlike the first embodiment, the applicator 1 of this embodiment includes first and second holders 4a and 4b, first and second brush-bars 5a and 5b, and first and second brushes 6a and 6b since the holder 4, the brush-bar 5, and the brush 6 as the components (one-stage brush structure) of the applicator 1 coupled to the rotary type linear reciprocating motion device 10 of the first embodiment are changed into the two-stage brush structure.

The first holder 4a may connect a first operating shaft 228 of a driving module 200a to the first brush-bar 5a of the applicator 1.

The second holder 4b may connect a second operating shaft 229 of the driving module 200a to the second brush-bar 5b of the applicator 1.

When one end portions of the first and second brush-bars 5a and 5b are directly connected to the first and second operating shafts 228 and 229, respectively, the first and second holders 4a and 4b may be omitted.

The first brush-bar 5a may receive a rotary motion force and a linear reciprocating motion force, which are transferred from the first operating shaft 228 of the driving module 200a by the first holder 4a, to enable the first brush 6a to perform a rotary motion and a linear reciprocating motion.

The second brush-bar 5b may receive a rotary motion force and a linear reciprocating motion force, which are transferred from the second operating shaft 229 of the driving module 200a by the second holder 4b, to enable the second brush 6b to perform a rotary motion and a linear reciprocating motion.

The first and second brush-bars 5a and 5b may be disposed in parallel to each other while being adjacent to each other.

The first brush 6a may be coupled to an end portion of the first brush-bar 5a, and be detachable.

The second brush 6b may be coupled to an end portion of the second brush-bar 5b, and be detachable.

The first and second brushes 6a and 6b are parts in direct contact with an object, and apply a cosmetic liquid to the object while simultaneously performing a rotary motion and a linear reciprocating motion. The object may be eyelashes when the applicator 1 is an electric mascara, and be teeth when the applicator 1 is an electric toothbrush instead of the electric mascara. However, the present disclosure is not limited thereto.

Hereinafter, the rotary type linear reciprocating motion device applied to the applicator 1 will be described in detail.

As shown in (a) and (b) of FIG. 7, the rotary type linear reciprocating motion device 20 in accordance with this embodiment may be mounted in various applicators 1, and be configured to allow the applicator 1 having the rotary type linear reciprocating motion device 10 mounted therein to simultaneously perform a rotary motion and a linear reciprocating motion.

Together with the driving module 200a configured to enable the applicator 1 to simultaneously perform a rotary motion and a linear reciprocating motion, although not shown in these drawings, the rotary type linear reciprocating motion device 20 may include components identical or similar to a motor 101 provided with a motor shaft 1011, a battery 102 for supplying power to the motor 101, and a switch 103 and a circuit board 104, which control the driving module 200a as described in the first embodiment. Accordingly, hereinafter, the driving module 200a as a component different to that of the first embodiment will be mainly described.

The driving module 200a may be installed in a case (not shown) similar to the first and second cases 2 and 3 of the first embodiment to allow the applicator 1 having the two-stage brush structure to simultaneously perform a rotary motion and a linear reciprocating motion. The driving module 200a may include a driving part 210, a rotating part 220, and a reciprocating part 230.

The driving part 210 may be rotatably driven by a driving force of a motor (not shown) identical or similar to the motor 101 of the first embodiment, and transfer a rotational force to the rotating part 220 and the reciprocating part 230. The driving part 210 may include a driving plate 211 and a driving belt 212.

The rotating part 220 and the reciprocating part 230 may be respectively installed at both surfaces of the driving plate 211, and the driving plate 211 may be configured in a disk shape.

The driving belt 212 may be installed at an edge of the driving plate 211, and be in contact with a motor shaft (not shown) identical or similar to the motor shaft 1011 of the first embodiment to allow the driving force of the motor to be transferred the driving plate 211 by a frictional force.

The driving belt 212 may be made of an elastic material of rubber, and be detachable from the driving plate 211.

The driving part 210 is not configured such that the motor shaft is coupled to the driving belt 212, but configured such that the motor shaft is in contact with a surface of the driving belt 212 to allow the driving plate 211 to be rotated by the frictional force. Thus, when a certain external pressure or higher is applied to at least one of the first and second brush-bars 5a and 5b or at least one of the first and second brushes 6a and 6b of the applicator 1 in which a rotary function and a reciprocating function are simultaneously implemented, rotation of the driving plate 211 is stopped by the external pressure. The motor shaft is idly rotated on the driving belt 212. Accordingly, although an overload is applied to the motor when a certain external pressure or higher is applied to the first and second brush-bars 5a and 5b or the first and second brushes 6a and 6b, the overload can be removed while the motor shaft is idly rotated.

The rotating part 220 may be installed at one surface of the driving part 210, and transfer the rotational force of the driving part 210 to the applicator 1 to enable the applicator 1 to perform a rotary motion. The rotating part 220 may include a word shaft 221, first and second worm gears 222 and 223, first and second internal spur gears 224 and 225, first and second external spur gears 226 and 227, and the first and second operating shafts 228 and 229.

The worm shaft 221 may be installed at one surface of the driving plate 211, to be rotated together with the driving plate 211. The worm shaft 221 may be disposed at the center of the driving plate 211. The worm shaft 221 may be a shaft made by directly cutting an outer surface thereof into a worm, or be a shaft inserted into a worm manufactured separately.

The first worm gear 222 may be rotated by being geared with one side of the worm of the worm shaft 221.

The second worm gear 223 may be rotated by being geared with the other side of the worm of the worm shaft 221.

The first and second worm gears 222 and 223 may be rotated inward at both the sides of the worm of the worm shaft 221.

The first internal spur gear 224 may be connected to the first worm gear 222 in one rotating shaft direction of the first worm gear 222. The first internal spur gear 224 may transfer a rotational force of the first worm gear 222 to the first external spur gear 226.

The second internal spur gear 225 may be connected to the second worm gear 223 in one rotating shaft direction of the second worm gear 223. The second internal spur gear 225 may transfer a rotational force of the second worm gear 223 to the second external spur gear 227.

The first external spur gear 226 may be geared with the first internal spur gear 224, and be provided on the same line as the first brush-bar 5a. The first external spur gear 226 may transfer a rotational force of the first internal spur gear 224 to the first operating shaft 228.

The second external spur gear 227 may be geared with the second internal spur gear 225, and be provided on the same line as the second brush-bar 5b. The second external spur gear 227 may transfer a rotational force of the second internal spur gear 225 to the second operating shaft 229.

Since each of the first and second external spur gears 226 and 227 is not restricted in an X-axis direction, each of the first and second external spur gears 226 and 227 may be moved, and be slidable through both a rotary motion performed by each of the first and second internal spur gears 224 and 225 and a linear reciprocating motion of each of coupling members 234a and 234b which will be described later within a range of gear engagement with each of the first and second internal spur gears 224 and 225. Accordingly, each of the first and second external spur gears 226 and 227 can transfer a rotary motion force to each of the first and second brush-bars 5a and 5b even when each of the first and second external spur gears 226 and 227 is moved in a shaft direction by the reciprocating part 230.

The first operating shaft 228 may be provided at one side of the first external spur gear 226 to be coupled to the first brush-bar 5a. The first operating shaft 228 may transfer, to the first brush-bar 5a, not only a rotary motion force generated by the first external spur gear 226 but also a linear reciprocating motion force generated by the reciprocating part 230 which will be described later.

The second operating shaft 229 may be provided at one side of the second external spur gear 227 to be coupled to the second brush-bar 5b. The second operating shaft 229 may transfer, to the second brush-bar 5b, not only a rotary motion force generated by the second external spur gear 227 but also a linear reciprocating motion force generated by the reciprocating part 230 which will be described later.

In the above, the rotational force of the driving plate 211, which is transferred to the word shaft 221, changes the axis of a rotary motion in a normal direction through the first and second worm gears 222 and 223, so that the rotary motion force can be transferred to the first brush-bar 5a through the first internal spur gear 224 and the first external spur gear 226 and the rotary motion force can be transferred to the second brush-bar 5b through the second internal spur gear 225 and the second external spur gear 227.

The reciprocating part 230 may be installed at the other surface of the driving part 210. The reciprocating part 230 may convert the rotational force of the driving part 210 into a linear reciprocating motion force and transfer the linear reciprocating motion force to the applicator 1 such that the applicator 1 can perform a linear reciprocating motion. The reciprocating part 230 may include an eccentric cam 231, an elliptical ring 232, a connecting-bar 233, the first and second coupling members 234a and 234b, and a link 235.

The eccentric cam 231 may be installed at the other surface of the driving plate 211, to be rotated together with the driving plate 211. Since the eccentric cam 231 has a central axis disposed at the center of the driving plate 211 and is eccentric, the eccentric cam 231 may allow the elliptical ring 232 to convert a rotational force transferred from the eccentric cam 231 into a linear reciprocating motion force.

The elliptical ring 232 may convert the rotational force transferred from the eccentric cam 231 into a linear reciprocating motion force.

When the eccentric cam 231 performs a rotary motion, the elliptical ring 232 has an elliptical groove having a width corresponding to the radius of a track and a width corresponding to the diameter of the track.

Since the eccentric cam 231 performs a rotary motion along an inner circumferential surface of the elliptical groove, the elliptical ring 232 performs a linear reciprocating motion.

The connecting-bar 233 may be connected to the elliptical ring 232, and extend toward the first brush-bar 5a. The connecting-bar 233 may transfer the linear reciprocating motion force of the elliptical ring 232 to the first coupling member 234a.

The first coupling member 234a may be connected to the connecting-bar 233. The first coupling member 234a may be coupled to the first operating shaft 228 while being penetrated by the first operating shaft 228 such that the first operating shaft 228 can be rotated. The first coupling member 234a may transfer the linear reciprocating motion force to the first operating shaft 228.

The second coupling member 234b may be coupled to the second operating shaft 229 while being penetrated by the second operating shaft 229 such that the second operating shaft 229 can be rotated. The second coupling member 234b may receive the linear reciprocating motion force transferred from the first coupling member 234a through the link 235 to transfer the linear reciprocating motion force to the second operating shaft 229.

The link 235 may be hinge-coupled to each of the first and second coupling members 234a and 234b, and transfer the linear reciprocating motion force of the first coupling member 234a to the second coupling member 234b.

In the driving module 200a of this embodiment, which is configured as described above, the first and second brush-bars 5a and 5b can perform a linear reciprocating motion in different directions by the link 235 hinge-coupled to the first and second coupling members 234a and 234b, while performing an internal rotary motion through the rotating part 220 in the two-stage brush structure.

(a) and (b) of FIG. 8 are views illustrating another embodiment of the driving module shown in FIG. 7.

As shown in (a) and (b) of FIG. 8, a driving module 200b in accordance with the another embodiment is different from the driving module 200a described above with reference to (a) and (b) of FIG. 7, and a configuration of a rotary type linear reciprocating motion device 20 is identical or similar to that of the rotary type linear reciprocating motion device 20 described above with reference to (a) and (b) of FIG. 7. Therefore, components of the driving module 200b of the another embodiment, which are different from those of the driving module 200a described above, will be mainly described to avoid redundancy.

Also, like the driving module 200a described above, the driving module 200b of the another embodiment may be installed in a case (not shown) similar to the first and second cases 2 and 3 of the first embodiment to allow the applicator 1 having the two-stage brush structure to simultaneously perform a rotary motion and a linear reciprocating motion. The driving module 200b may include a driving part 210, a rotating part 220, and a reciprocating part 230. The driving part 210 and the rotating part 220 are identical or similar to those of the driving module 200a described above, and only the reciprocating part 230 is different from that of the driving module 200a described above. Therefore, components of the reciprocating part 230, which are different from those of the reciprocating part 230 of the driving module 200a described above, will be mainly described to avoid redundancy.

The reciprocating part 230 of the another embodiment may be installed at the other surface of the driving part 210. The reciprocating part 230 may convert a rotational force of the driving part 210 into a linear reciprocating motion force and transfer the linear reciprocating motion force to the applicator 1 such that the applicator 1 can perform a linear reciprocating motion. The reciprocating part 230 may include an eccentric cam 231, an elliptical ring 232, first and second connecting-bars 233a and 233b, and a common coupling member 234c.

The eccentric cam 231 may be installed at the other surface of the driving plate 211, to be rotated together with the driving plate 211. Since the eccentric cam 231 has a central axis disposed at the center of the driving plate 211 and is eccentric, the eccentric cam 231 may allow the elliptical ring 232 to convert a rotational force transferred from the eccentric cam 231 into a linear reciprocating motion force.

The elliptical ring 232 may convert the rotational force transferred from the eccentric cam 231 into a linear reciprocating motion force.

When the eccentric cam 231 performs a rotary motion, the elliptical ring 232 has an elliptical groove having a width corresponding to the radius of a track and a width corresponding to the diameter of the track.

Since the eccentric cam 231 performs a rotary motion along an inner circumferential surface of the elliptical groove, the elliptical ring 232 performs a linear reciprocating motion.

The first connecting-bar 233a may be connected to one side of the elliptical ring 232, and extend toward the first brush-bar 5a. The first connecting-bar 233a may transfer the linear reciprocating motion force of the elliptical ring 232 to the first coupling member 234a.

The second connecting-bar 233b may be connected to the other side of the elliptical ring 232, and extend toward the second brush-bar 5b. The second connecting-bar 233b may transfer the linear reciprocating motion force of the elliptical ring 232 to the second coupling member 234b.

The common coupling member 234c may connect between the first connecting-bar 233a and the second connecting-bar 233b. The common coupling member 234c may be coupled to each of the first and second operating shafts 228 and 229 while being penetrated by each of the first and second operating shafts 228 and 229 such that each of the first and second operating shafts 228 and 229 can be rotated. The common coupling member 234c may transfer the linear reciprocating motion force to the first and second operating shafts 228 and 229.

In the driving module 200b of the another embodiment, which is configured as described above, the first and second brush-bars 5a and 5b can perform a linear reciprocating motion in the same direction by the common coupling member 234c which connects both the first and second connecting-bars 233a and 233b and the first and second operating shafts 228 and 229, while performing an internal rotary motion through the rotating part 220 in the two-stage brush structure.

(a) and (b) of FIG. 9 are views illustrating still another embodiment of the driving module shown in FIG. 7.

As shown in (a) and (b) of FIG. 9, a driving module 200c in accordance with the still another embodiment is different from the driving module 200a described above with reference to (a) and (b) of FIG. 7, and a configuration of a rotary type linear reciprocating motion device 20 is identical or similar to that of the rotary type linear reciprocating motion device 20 described above with reference to (a) and (b) of FIG. 7. Therefore, components of the driving module 200c of the still another embodiment, which are different from those of the driving module 200a described above, will be mainly described to avoid redundancy.

Also, like the driving module 200a described above, the driving module 200b of the another embodiment may be installed in a case (not shown) similar to the first and second cases 2 and 3 of the first embodiment to allow the applicator 1 having the two-stage brush structure to simultaneously perform a rotary motion and a linear reciprocating motion. The driving module 200b may include a driving part 210, a rotating part 220, and a reciprocating part 230. The driving part 210 and the rotating part 220 are identical or similar to those of the driving module 200a described above, and only the reciprocating part 230 is different from that of the driving module 200a described above. Therefore, components of the reciprocating part 230, which are different from those of the reciprocating part 230 of the driving module 200a described above, will be mainly described to avoid redundancy.

The reciprocating part 230 of the still another embodiment may be installed at the other surface of the driving part 210. The reciprocating part 230 may convert a rotational force of the driving part 210 into a linear reciprocating motion force and transfer the linear reciprocating motion force to the applicator 1 such that the applicator 1 can perform a linear reciprocating motion. The reciprocating part 230 may include a two-stage eccentric cam 231a, first and second elliptical rings 232a and 232b, first and second connecting-bars 233a and 233b, and first and second coupling members 234a and 234b.

The two-stage eccentric cam 231a may be installed at the other surface of the driving plate 211, to be rotated together with the driving plate 211. The two-stage eccentric cam 231a may be configured with a lower eccentric cam and an upper eccentric cam.

The lower eccentric cam and the upper eccentric cam, which constitute the two-stage eccentric cam 231a, have central axes disposed at the center of the driving plate 211, and may be provided to be eccentric in the same direction or different directions. Therefore, the first elliptical ring 232a may convert a rotational force transferred from the lower eccentric cam constituting the two-stage eccentric cam 231a into a linear reciprocating motion force, and the second elliptical ring 232b may convert a rotational force transferred from the upper eccentric cam constituting the two-stage eccentric cam 231a into a linear reciprocating motion force.

In this embodiment, the lower eccentric cam and the upper eccentric cam, which constitute the two-stage eccentric cam 231a, may be provided to have a phase difference of 180 degrees. The first and second brush-bars 5a and 5b may perform a linear reciprocating motion in different directions through the two-stage eccentric cam 231a having the phase difference of 180 degrees, while being rotated inward.

Also, in this embodiment, the lower eccentric cam and the upper eccentric cam, which constitute the two-stage eccentric cam 231a, may be provided to have a phase difference of 0. The first and second brush-bars 5a and 5b may perform a linear reciprocating motion in the same direction through the two-stage eccentric cam 231a having the phase difference of 0, while being rotated inward.

The first elliptical ring 232a may convert the rotational force transferred from the lower eccentric cam constituting the two-state eccentric cam 231a into a linear reciprocating motion force.

The second elliptical ring 232b may convert the rotational force transferred from the upper eccentric cam constituting the two-state eccentric cam 231a into a linear reciprocating motion force above the first elliptical ring 232a.

When each of the lower eccentric cam and the upper eccentric cam, which constitute the two-stage eccentric cam 231a, performs a rotary motion, each of the first and second elliptical rings 232a and 232b has an elliptical groove having a width corresponding to the radius of a track and a width corresponding to the diameter of the track.

Since the two-stage eccentric cam 231a performs a rotary motion along an inner circumferential surface of the elliptical groove, the first and second elliptical rings 232a and 232b perform a linear reciprocating motion.

The first connecting-bar 233a may be connected to one side of the first elliptical ring 232a, and extend toward the first brush-bar 5a. The first connecting-bar 233a may transfer the linear reciprocating motion force of the first elliptical ring 232a to the first coupling member 234a.

The second connecting-bar 233b may be connected to the other side of the second elliptical ring 232b, and extend toward the second brush-bar 5b. The second connecting-bar 233b may transfer the linear reciprocating motion force of the second elliptical ring 232b to the second coupling member 234b.

The first coupling member 234a may be connected to the first connecting-bar 233a. The first coupling member 234a may be coupled to the first operating shaft 228 while being penetrated by the first operating shaft 228 such that the first operating shaft 228 can be rotated. The first coupling member 234a may transfer the linear reciprocating motion force to the first operating shaft 228.

The second coupling member 234b may be connected to the second connecting-bar 233b. The second coupling member 234b may be coupled to the second operating shaft 229 while being penetrated by the second operating shaft 229 such that the second operating shaft 229 can be rotated. The second coupling member 234b may receive the linear reciprocating motion force transferred from the first coupling member 234a through the link 235 to transfer the linear reciprocating motion force to the second operating shaft 229.

In the driving module 200c of the still another embodiment, which is configured as described above, the first and second brush-bars 5a and 5b can perform a linear reciprocating motion in the same direction (the phase difference of 0) or different directions (the phase difference of 180 degrees) according to a phase difference between the first and second connecting-bars 233a and 233b independently operated by the two-stage eccentric cam 231a and a phase difference between the lower eccentric cam and the upper eccentric cam, which constitute the two-stage eccentric cam 231a, while performing an internal rotary motion through the rotating part 220 in the two-stage brush structure.

As described above, in these embodiments, when a certain external pressure or higher is applied to the applicator 1 while the applicator 1 is performing a rotary motion and a linear reciprocating motion, the motor 101 is idly rotated, so that the motor 101 or the applicator 1 can be prevented from being damaged due to an overload.

Also, in these embodiments, when the applicator 1 has a one-stage brush structure, one brush-bar 5 simultaneously performs a rotary motion and a linear reciprocating motion, so that a cosmetic product does not agglomerate but can be finely and evenly applied on an object to be applied.

Also, in these embodiments, when the applicator 1 has a two-stage brush structure, two brush-bars 5a and 5b perform a linear reciprocating motion in the same direction or different directions while performing an internal rotary motion, so that two brushes 6a and 6b can implement various functions of scrubbing, pushing, pulling, and rubbing in a state in which the two brushes 6a and 6b slightly press an object. Thus, a cosmetic product does not agglomerate but can be more finely and evenly applied on an object to be applied.

The exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

What is claimed is:

1. A rotary type linear reciprocating motion device comprising:
   a driving part rotatably driven by a motor;
   a rotating part installed at one surface of the driving part, the rotating part transferring a rotational force of the driving part to an applicator; and
   a reciprocating part installed at an other surface of the driving part, the reciprocating part converting the rotational force of the driving part into a linear reciprocating motion force, the reciprocating part transferring the linear reciprocating motion force to the applicator,
   wherein the driving part includes:
      a driving plate having both surfaces at which the rotating part and the reciprocating part are respectively installed; and
      a driving belt installed at an edge of the driving plate, the driving belt being in contact with a motor shaft of the motor to allow a driving force of the motor to be transferred to the driving plate by a frictional force,
   wherein the applicator includes:
      a brush-bar connected to the rotating part; and
      a brush coupled to an end portion of the brush-bar,
   wherein the rotating part includes:
      a worm shaft installed at one surface of the driving plate to be rotated together with the driving plate;
      a worm gear geared with a worm of the worm shaft to be rotated;
      a first spur gear connected to the worm gear in one rotating shaft direction of the worm gear;
      a second spur gear geared with the first spur gear, the second spur gear being provided on the same line as the brush-bar; and
      an operating shaft provided at one side of the second spur gear to be coupled to brush-bar, the operating shaft transferring a rotary motion force and a linear reciprocating motion force, and wherein the second spur gear is movable since the second spur gear is not restricted in an X-axis direction, and is slidable through both a rotary motion performed by the first spur gear and a linear reciprocating motion of the reciprocating part within a range of engagement with the first spur gear.

2. The rotary type linear reciprocating motion device of claim 1, wherein the driving belt is made of an elastic material of rubber, and is detachable from the driving plate.

3. The rotary type linear reciprocating motion device of claim 1, wherein the motor shaft is idly rotated, when a certain external pressure or higher is applied to the applicator in which a rotary function and a reciprocating function are simultaneously implemented.

4. The rotary type linear reciprocating motion device of claim 1, wherein the applicator has a one-stage brush structure in which a rotary motion and a linear reciprocating motion are simultaneously implemented by the rotating part and the reciprocating part.

5. The rotary type linear reciprocating motion device of claim 4, wherein the reciprocating part includes:
   an eccentric cam installed at the other surface of the driving plate to be rotated together with the driving plate;
   an elliptical ring performing a linear reciprocating motion through the rotation of the eccentric cam;
   a connecting-bar connected to the elliptical ring, the connecting-bar extending toward the brush-bar; and
   a coupling member connected to the connecting-bar, the coupling member being coupled to the operating shaft while being penetrated by the operating shaft such that the operating shaft is rotatable, the coupling member transferring a linear reciprocating motion force to the operating shaft.

6. An applicator comprising the rotary type linear reciprocating motion device of claim 1.

* * * * *